(12) United States Patent
Crews et al.

(10) Patent No.: US 7,347,266 B2
(45) Date of Patent: Mar. 25, 2008

(54) USE OF MINERAL OILS, HYDROGENATED POLYALPHAOLEFIN OILS AND SATURATED FATTY ACIDS FOR BREAKING VES-GELLED FLUIDS

(75) Inventors: James B. Crews, Willis, TX (US); John R. Willingham, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/517,688

(22) Filed: Sep. 8, 2006

(65) Prior Publication Data

US 2007/0056737 A1    Mar. 15, 2007

Related U.S. Application Data

(60) Provisional application No. 60/717,307, filed on Sep. 15, 2005.

(51) Int. Cl.
E21B 43/27 (2006.01)
(52) U.S. Cl. ...................... 166/300; 166/303
(58) Field of Classification Search ............... None
See application file for complete search history.

(56) References Cited

U.S. PATENT DOCUMENTS

| | | | |
|---|---|---|---|
| 4,502,969 A * | 3/1985 | Shell ........................ | 507/211 |
| 5,964,295 A | 10/1999 | Brown et al. | |
| 6,881,709 B2 | 4/2005 | Nelson et al. | |
| 2004/0152604 A1 | 8/2004 | Qu et al. | |
| 2007/0032386 A1 * | 2/2007 | Abad et al. ................. | 507/201 |

FOREIGN PATENT DOCUMENTS

WO    WO 2004/087286 A1    10/2004

OTHER PUBLICATIONS

B. R. Stewart, et al., "Use of a Solids-free Viscous Carrying Fluid in Fracturing Applications: An Economic and Productivity Comparison in Shallow Completions," SPE 30114, European Formation Damage Control Conference, May 15-16, 1995; pp. 379-392, The Hague, Netherlands.

(Continued)

Primary Examiner—Jennifer H. Gay
Assistant Examiner—Angela DiTrani
(74) Attorney, Agent, or Firm—Madan Mossman & Sriram PC

(57) ABSTRACT

Fluids viscosified with viscoelastic surfactants (VESs) may have their viscosities reduced (gels broken) by the direct or indirect action of a breaker composition that contains at least one mineral oil, at least one polyalphaolefin oil, and/or at least one saturated fatty acid. The breaker may initially be dispersed oil droplets in an internal, discontinuous phase of the fluid. In one non-limiting embodiment, the breaker, e.g. mineral oil is added to the fluid after it has been substantially gelled. The breaking composition is believed to act possibly by rearranging, disaggregating or otherwise attacking the micellar structure of the VES-gelled fluid in a non-spontaneous, rate controlled manner at elevated fluid temperatures. In a specific, non-limiting instance, a brine fluid gelled with an amine oxide surfactant can have its viscosity broken with a light, low viscosity paraffinic mineral oil.

9 Claims, 3 Drawing Sheets

OTHER PUBLICATIONS

J. E. Brown, et al., "Use of a Viscoelastic Carrier Fluid in Frac-Pack Applications," SPE 31114, SPE Formation Damage Symposium, Feb. 14-15, 1996, pp. 439-448, Lafayette, LA.

Exxonmobil Chemical, "Hydrocarbon Fluids: EXXSOL D 80 Fluid," 2000.

M. Samuel, et al., "Viscoelastic Surfactant Fracturing Fluids: Applications in Low Permeability Reservoirs," SPE 60322, 2000 SPE Rocky Mountain Regional/Low Permeability Reservoirs Symposium, Mar. 12-15, 2000, pp. 1-7, Denver, Colorado.

P. M. McElfresh, et al., "A Single Additive Non-ionic System for Frac Packing Offers Operators a Small Equipment Footprint and High Compatibility with Brines and Crude Oils," SPE 82245, SPE European Formation Damage Conference, May 13-14, 2003, pp. 1-11, The Hague, Netherlands.

Crompton, "HYDROBRITE 200 PO White Mineral Oil," Product Brochure, Sep. 8, 2005, available at http://www.cromptoncorp./servlet.

Crompton, Product Search Results for "White Mineral Oil", Sep. 8, 2005, available at http://www.cromptoncorp./servlet.

Crompton, Related Product Search Results citing "HYDROBRITE 200 PO White Mineral Oil" and "HYDROBRITE 550 PO White Mineral Oil", Sep. 8, 2005, available at http://www.cromptoncorp./servlet.

* cited by examiner

Viscosity Break Tests at 250 F (121 C)

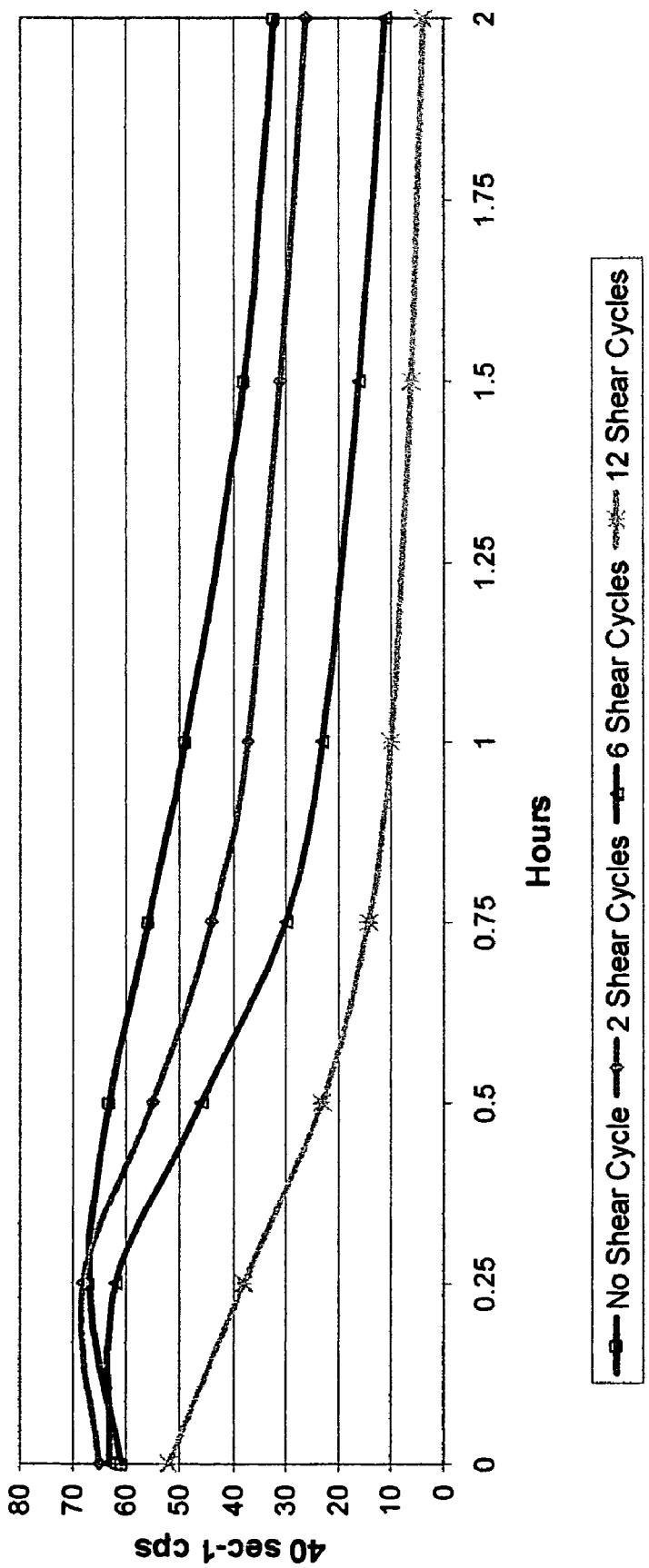

USE OF MINERAL OILS, HYDROGENATED POLYALPHAOLEFIN OILS AND SATURATED FATTY ACIDS FOR BREAKING VES-GELLED FLUIDS

This application claims the benefit of U.S. Provisional Application No. 60/717,307 filed Sep. 15, 2005.

TECHNICAL FIELD

The present invention relates to gelled treatment fluids used during hydrocarbon recovery operations, and more particularly relates, in one embodiment, to methods of "breaking" or reducing the viscosity of aqueous treatment fluids containing viscoelastic surfactant gelling agents used during hydrocarbon recovery operations.

TECHNICAL BACKGROUND

One of the primary applications for viscosified fluids is hydraulic fracturing. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous-based liquids that have either been gelled or foamed. When the fluids are gelled, typically a polymeric gelling agent, such as a solvatable polysaccharide, for example guar and derivatized guar polysaccharides, is used. The thickened or gelled, fluid helps keep the proppants within the fluid. Gelling can be accomplished or improved by the use of crosslinking agents or crosslinkers that promote crosslinking of the polymers together, thereby increasing the viscosity of the fluid. One of the more common crosslinked polymeric fluids is borate crosslinked guar.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslink stability and controlled enzyme breaker activity.

While polymers have been used in the past as gelling agents in fracturing fluids to carry or suspend solid particles as noted, such polymers require separate breaker compositions to be injected to reduce the viscosity. Further, such polymers tend to leave a coating on the proppant and a filter cake of dehydrated polymer on the fracture face even after the gelled fluid is broken. The coating and/or the filter cake may interfere with the functioning of the proppant. Studies have also shown that "fish-eyes" and/or "microgels" present in some polymer gelled carrier fluids will plug pore throats, leading to impaired leakoff and causing formation damage.

Recently it has been discovered that aqueous drilling and treating fluids may be gelled or have their viscosity increased by the use of non-polymeric viscoelastic surfactants (VES). These VES materials are in many cases advantageous over the use of polymer gelling agents in that they are comprised of low molecular weight surfactants rather than high molecular polymers. The VES materials may leave less gel residue within the pores of oil producing formations, leave no filter cake (dehydrated polymer) on the formation face, leave a minimal amount of residual surfactant coating the proppant, and inherently do not create microgels or "fish-eyes"-type polymeric masses.

However, little progress has been made toward developing internal breaker systems for the non-polymeric VES-based gelled fluids. To this point, VES gelled fluids have relied only on "external" or "reservoir" conditions for viscosity reduction (breaking) and VES fluid removal (clean-up) during hydrocarbon production. Additionally, over the past decade it has been found that reservoir brine dilution has only a minor, if any, breaking effect of VES gel within the reservoir.

Instead, only one reservoir condition is primarily relied on for VES fluid viscosity reduction (gel breaking or thinning), and that has been the rearranging, disturbing, and/or disbanding of the VES worm-like micelle structure by contacting the hydrocarbons within the reservoir, more specifically contacting and mixing with crude oil and condensate hydrocarbons, as described in U.S. Pat. No. 5,964,295. SPE 30114 describes how reservoir hydrocarbons reduce the viscosity of VES-gelled fluids. SPE 31114 notes that when a VES-gelled fluid contacts crude or condensate reservoir hydrocarbons, the VES-gelled fluid will break, i.e. lose viscosity. SPE 60322 describes how oil or gas reservoir hydrocarbons alter the worm-like micelles of a VES-gelled fluid into spherical micelle structures which results in water-like fluid viscosity. SPE 82245 explains that contact of a VES-gelled fluid system with hydrocarbons causes the fluid to lose its viscosity.

However, in many gas wells and in cases of excessive displacement of crude oil hydrocarbons from the reservoir pores during a VES gel treatment, results have showed many instances where VES fluid in portions of the reservoir are not broken or are incompletely broken resulting in residual formation damage (hydrocarbon production impairment). In such cases post-treatment clean-up fluids composed of either aromatic hydrocarbons, alcohols, surfactants, mutual solvents, and/or other VES breaking additives have been pumped within the VES treated reservoir in order to try and break the VES fluid for removal. However, placement of clean-up fluids is problematic and normally only some sections of the reservoir interval are cleaned up, leaving the remaining sections with unbroken or poorly broken VES gelled fluid that impairs hydrocarbon production. Because of this phenomenon and other occasions where reliance on external factors or mechanisms has failed to clean-up the VES fluid from the reservoir during hydrocarbon production, or in cases where the external conditions are slow acting (instances where VES breaking and clean-up takes a long time, such as several days up to possibly months) to break and then produce the VES treatment fluid from the reservoir, and where post-treatment clean-up fluids (i.e. use of external VES breaking solutions) are inadequate in removing unbroken or poorly broken VES fluid from all sections of the hydrocarbon bearing portion of the reservoir, there has been an increasing and important industry need for VES fluids to have internal breakers. Desirable internal breakers that should be developed include breaker systems that use products that are incorporated within the VES-gelled fluid that are activated by downhole temperature that will allow a controlled rate of gel viscosity reduction over a rather short period of time of 1 to 8 hours or so, similar to gel break times common for conventional crosslinked polymeric fluid systems.

A challenge has been that VES-gelled fluids are not comprised of polysaccharide polymers that are easily degraded by use of enzymes or oxidizers, but are comprised of surfactants that associate and form viscous rod- or worm-shaped micelle structures. Conventional enzymes and oxidizers have not been found to act and degrade the surfactant molecules or the viscous micelle structures they form. It is still desirable, however, to provide some mechanism that relies on and uses internal phase breaker products that will help assure complete viscosity break of VES-gelled fluids.

It would be desirable if a viscosity breaking system could be devised to break the viscosity of fracturing and other well completion fluids gelled with and composed of viscoelastic surfactants, particularly break the viscosity completely and relatively quickly.

SUMMARY

There is provided, in one form, a method for controllably breaking the viscosity of aqueous fluids gelled with a viscoelastic surfactant (VES) that involves adding to an aqueous fluid substantially gelled with at least one viscoelastic surfactant at least one breaker in an amount effective to reduce the viscosity of the gelled aqueous fluid at a time other than essentially instantaneously. The fluid is then heated to a temperature effective to cause the breaker to reduce the viscosity of the gelled aqueous fluid. The breaker may be a mineral oil, a hydrogenated polyalphaolefin oil and/or a saturated fatty acid.

In another embodiment, there is provided an aqueous fluid that includes water; at least one viscoelastic surfactant (VES) in an amount effective to increase the viscosity of the aqueous fluid; and at least one breaker in an amount effective to reduce the viscosity of the gelled aqueous fluid at a time other than essentially instantaneously when the fluid is heated to an effective temperature. The breaker may be a mineral oil, a hydrogenated polyalphaolefin oil and/or a saturated fatty acid.

BRIEF DESCRIPTION OF THE DRAWINGS

FIG. 3 is a graph of viscosity as a function of time showing the effects of increasing numbers of shear cycles on an aqueous fluid having 4 wt % NaCl gelled with 3 vol % WG-3L and 0.5 vol % ESCAID® 110 breaker at 150° F. (66° C.).

DETAILED DESCRIPTION

Figure 1:
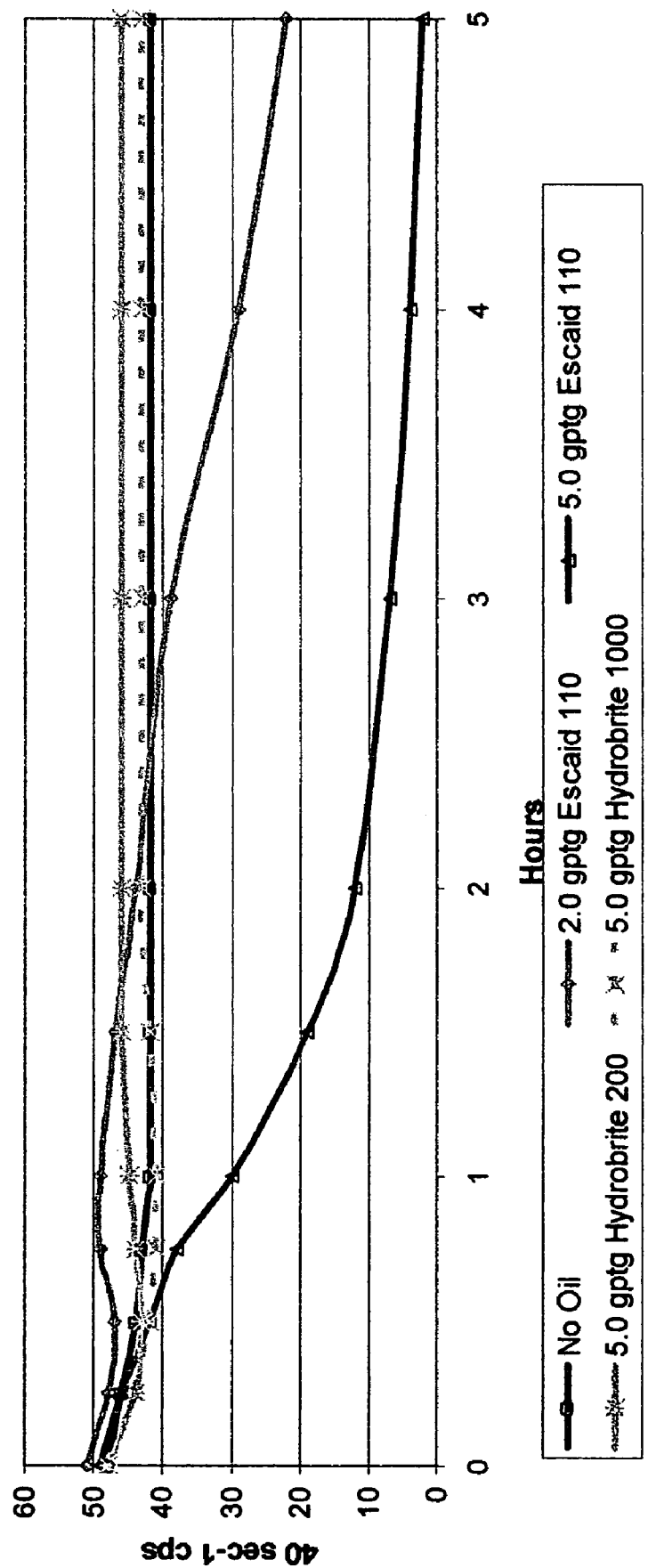
FIG. 1 is a graph showing the viscosity breaking results using three different mineral oils in different proportions within a 3 vol % WG-3L VES-gelled fluid at 100° F. (38° C.) having 3 wt % KCl.

As noted, aqueous fluids gelled with viscoelastic surfactants are typically used in wellbore completions, such as hydraulic fracturing, without the use of an internal phase breaker system, and typically rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has showed instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional crosslinked polymer fluids, preferably using an internal breaker. At the same time, it is not desirable to reduce the viscosity of the fluid, i.e. break the gel immediately or essentially instantaneously.

A new method has been discovered to reduce the viscosity of aqueous fluids gelled with viscoelastic surfactants (i.e. surfactants that develop viscosity in aqueous brines, including chloride brines, by formation of rod- or worm-shaped micelle structures). The improvement will allow relatively very quick breaks, such as within 1 to about 16 hours, compared to the current technology of using bacteria to break VES which takes at least 48 or more hours, and more typically 4 to 7 days. In another non-limiting embodiment the break occurs within 1 to about 8 hours; alternatively from 1 to about 4 hours, and in another non-restrictive version 1 to about 2 hours. The breaker component of this invention can be added to the gel after batch mixing of a VES-gel treatment, or added on-the-fly after continuous mixing of a VES-gel treatment using a liquid additive metering system in one non-limiting embodiment, or the components can be used separately, if needed, as an external breaker solution to remove VES gelled fluids already placed downhole. The mineral oils are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase".

Surprisingly and unexpectedly the method employs mineral oils as the breaking component. This is surprising because, as previously discussed, the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is controlled by type and amount of salts within the mix water (i.e. seawater, KCl, NaBr, $CaCl_2$, $CaBr_2$, $NH_4Cl$ and the like), presence of a VES gel stabilizer (i.e. MgO, ZnO and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of mineral oil used, the distillation range of the mineral oil, its kinematic viscosity, the presence of components such as aromatic hydrocarbons, and the like.

It is important in most non-limiting embodiments of the invention to add the mineral oil after the aqueous fluid is substantially gelled. Addition of the mineral oil prior to substantial gelling tends to prevent the gelling or viscosity increase to occur. By "substantially gelled" is meant that at least 90% of the viscosity increase has been achieved before the mineral oil is added. Of course, it is acceptable to add the mineral oil after the gel has completely formed.

aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL®, ISOPAR® and the like mineral oils available from ExxonMobil Chemical, and similar products from other mineral oil manufacturers. A few non-limiting examples are specified in Table 1. The ESCAID 110® and CONOCO LVT-200® mineral oils have been well known components of oil-based drilling muds and the oil industry has considerable experience with these products, thus making them an attractive choice. The white mineral oils from Crompton Corporation with their high purity and high volume use within other industries are also an attractive choice.

TABLE 1

Properties of Various Mineral Oils

| Properties | ESCAID ® 110 | EXXSOL ® D110 | ISOPAR ® V | Benol ® | HYDROBRITE ® 200 | HYDROBRITE ® 1000 |
|---|---|---|---|---|---|---|
| Specific Gravity | 0.790-0.810 | 0.780-0.830 | 0.810-0.830 | 0.839-0.855 | 0.845-0.885 | 0.860-0.885 |
| Viscosity @ 40° C. | 1.3-1.9 | — | — | 18.0-20.0 | 39.5-46.0 | 180.0-240.0 |
| Flash Point (° C.) | 77.0 | 105 | 118 | 186 | — | 288 |
| Pour Point (° C.) | — | — | — | −21.0 | −9.0 | −6.0 |
| Distillation Range | | | | | | |
| IBP (° C.) | 200 | 237 | 263 | — | — | — |
| Max DP (° C.) | 248 | 277 | 329 | — | — | — |
| GC Distillation 5% (° C.) | — | — | — | — | >380 | >407 |
| Molecular Wt. | — | — | — | — | — | >480 |
| Aromatic Content | <0.5% | <1.0% | <0.5% | — | — | -- |

Note:
Escaid, Exxsol and Isopar are trademarks of ExxonMobil Corporation. Benol and Hydrobrite are trademarks of Crompton Corporation.

Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, white mineral oil, and white oil.

In one non-limiting embodiment the mineral oil is at least 99 wt % paraffinic. Because of the relatively low content of It has been discovered in breaking VES-gelled fluids prepared in monovalent brines (such as 3% KCl brine) that at temperatures below about 180° F. (82° C.) ESCAID® 110 mineral oil works well in breaking VES-gelled fluids, and that at or above about 140° F. (60° C.) HYDROBRITE® 200 mineral oil works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 mineral oil to 50 wt % HYDROBRITE® 200 mineral oil may be used to achieve controlled, fast and complete break of a VES-gelled fluid.

Figure 2:
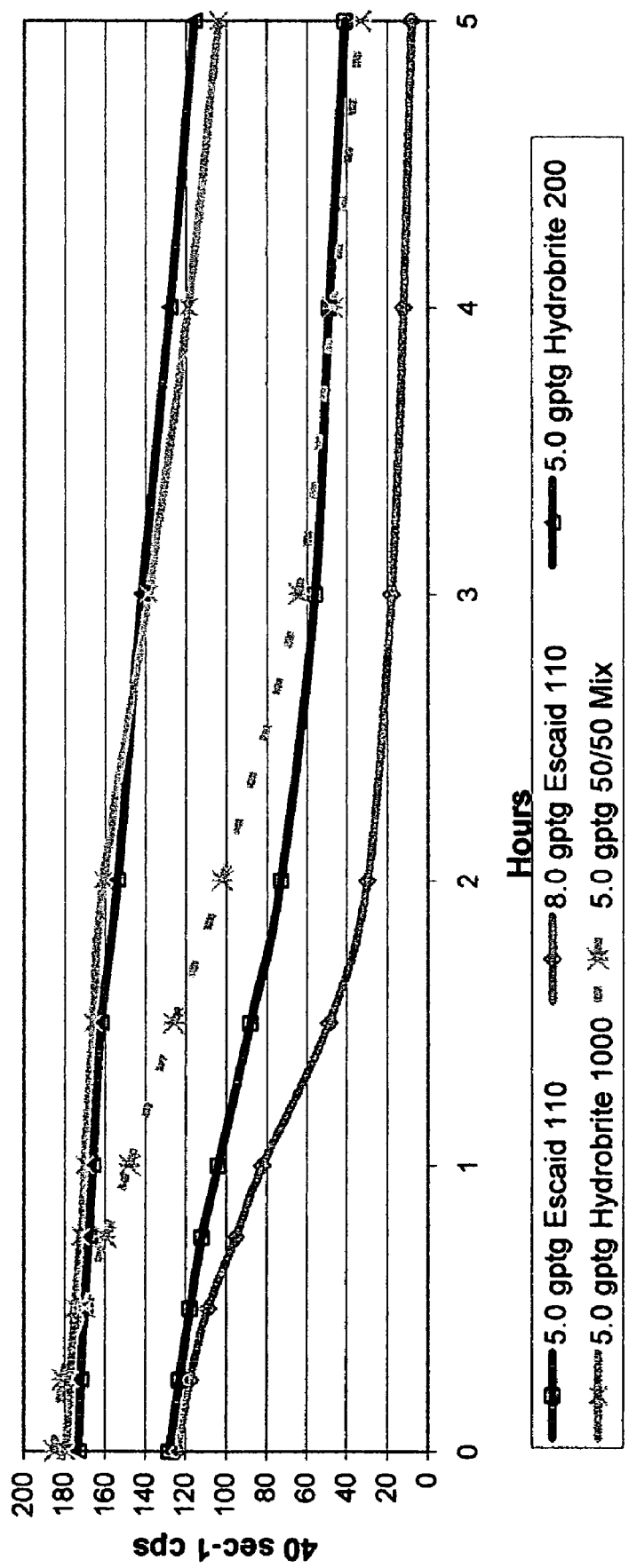
FIG. 2 is a graph of showing the viscosity breaking results using the three different mineral oils of FIG. 1 and a 50/50 blend of two oils thereof within fluid gelled with 3 vol % WG-3L and 2 pptg VES-STA 1 (0.24 kg/m$^3$) at 250° F. (121° C.) having 10.0 ppg CaCl$_2$ (1.2 kg/liter)

It has also been discovered that type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 available from Baker Oil Tools) may affect the activity of a mineral oil in breaking a VES fluid at a given temperature. For example, FIG. 1 shows ESCAID® 110 mineral oil at 5.0 gptg will readily break the 3 wt % KCl based VES fluid at 100° F. (38° C.) over a 5 hour period, and FIG. 2 shows ESCAID® 110 mineral oil may still have utility as a breaker for a 10.0 ppg $CaCl_2$ (21 wt % $CaCl_2$) based VES fluid at 250° F. (121° C.) The VES fluid in FIG. 2 also includes a VES stabilizer (2.0 pptg VES-STA 1).

In one non-limiting embodiment these gel-breaking products work by rearrangement of the VES micelle from rod-shaped or worm-shaped elongated structures to spherical structures. The breaking components described herein are different than the unsaturated fatty acid or polyenoic and monoenoic components of U.S. provisional patent application No. 60/662,336. In one non-limiting embodiment these unsaturated fatty acids (e.g. oleic, linoleic, linolenic, eicosapentaenoic, etc.) may possibly be used together with the mineral oils herein. In another non-limiting embodiment, natural unsaturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice this invention.

The breaking or viscosity reduction is triggered or initiated by heat. These mineral oils will slowly, upon heating, break or reduce the viscosity of the VES gel with the addition of or in the absence of any other viscosity reducing agent. The amount of mineral oil needed to break a VES-gelled fluid appears temperature dependent, with less needed as the fluid temperature increases. The kinematic viscosity, molecular weight distribution, and amount of impurities (such as aromatics, olefins, and the like) also appear to influence the rate in which a mineral oil will break a VES-gelled fluid at a given temperature. Once a fluid is completely broken at an elevated temperature a degree of viscosity reheal may occur but in most cases no rehealing is expected because, as noted, it is difficult or impossible to create a gelled fluid in the presence of mineral oil in the first place. The effective amount of mineral oil ranges from about 0.1 to about 15 gptg based on the total fluid, in another non-limiting embodiment from a lower limit of about 0.5. Independently the upper limit of the range may be about 10 gptg based on the total fluid. (It will be appreciated that units of gallon per thousand gallons (gptg) are readily converted to Sl units of the same value as, e.g. liters per thousand liters.)

Controlled viscosity reduction rates can be achieved at a temperature of from about 70° F. to about 300° F. (about 21 to about 149° C.), and alternatively at a temperature of from about 100° F. independently to an upper end of the range of about 280° F. (about 38 to about 138° C.). It has also been discovered that VES-gelled aqueous fluids containing the small amounts of mineral oils described herein are relatively shear stable and can tolerate some shear before viscosity reduction occurs. In one non-limiting embodiment, the fluid designer would craft the fluid system in such a way that the VES gel would break at or near the formation temperature after fracturing was accomplished.

Fluid design would be based primarily on formation temperature, i.e. the temperature the fluid will be heated to naturally in the formation once the treatment is over. Fluid design may be based on the expected cool down of the fluid during a treatment. In many cases the fracturing fluid may only experience actual reservoir temperature for 5% to 25% of the job time, and close to 50% of the fluid is never exposed-to the original reservoir temperature because of the cool down of the reservoir by the initial fracturing fluid placed into the reservoir. It is because a portion of the fracturing fluid will not see or be exposed to the original reservoir temperature that a cooler temperature is selected that will represent what the fluid will probably see or contact, and thus laboratory break tests, such as those discussed below, are run at this cooler temperature. There would generally be no additional temperature the VES fluid would see other than original reservoir temperature.

The use of the disclosed breaker system is ideal for controlling viscosity reduction of VES based fracturing fluids. The breaking system may also be used for breaking gravel pack fluids, acidizing or near-wellbore clean-up diverter fluids, and loss circulation pill fluids composed of VES. The breaker system may additionally work for foamed fluid applications (hydraulic fracturing, acidizing, and the like), where $N_2$ or $CO_2$ gas is used for the gas phase. This VES breaking method is a significant improvement in that it gives breaking rates for VES based fluids that the industry is accustomed to with conventional polymer based fracturing fluids, such as borate crosslinked guar. Potentially more importantly, the use of this internal breaker system in combination with external downhole breaking conditions should help assure and improve hydrocarbon production compared to prior art that uses only external mechanisms to break the VES fluid for effective and complete VES fluid clean-up after a treatment.

In one non-limiting embodiment of the invention, the compositions herein will directly degrade the gel created by a VES in an aqueous fluid, and alternatively will reduce the viscosity of the gelled aqueous fluid either directly, or by disaggregation or rearrangement of the VES micellar structure. However, the inventors do necessarily not want to be limited to any particular mechanism.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular mineral oil used; the temperature of the fluid; the downhole pressure of the fluid, the starting pH of the fluid; and the complex interaction of these various factors. Nevertheless, in order to give an approximate feel for the proportions of the various breaking components to be used in the method of the invention, approximate ranges will be provided. In an alternative, non-limiting embodiment the amount of mineral oil that may be effective in the invention may range from about 5 to about 25,000 ppm, based on the total amount of the fluid. In another non-restrictive version of the invention, the amount of mineral oil may range from a lower end of about 50 independently to an upper end of about 12,000 ppm.

Any suitable mixing apparatus may be used for this procedure. In the case of batch mixing, the VES and the aqueous fluid are blended for a period of time sufficient to form a gelled or viscosified solution. The mineral oil should be added after the fluid is formulated or at least after the fluid is substantially gelled. The VES that is useful in the present invention can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the fracturing (frac) fluid performance through the use of a polymer-free system. These systems, compared to polymeric based fluids, can offer improved viscosity breaking, higher sand transport capability, are in many cases more easily recovered after treatment than polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwifterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2 O^-$ may have the following structure (I):

(I)

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's AROMOX® APA-T formulation, which should be understood as a dipropylamine oxide since both R' groups are propyl.

Materials sold under U.S. Pat. No. 5,964,295 include CLEARFRAG™ VES system, which may also comprise greater than 10% of a glycol. One preferred VES is an amine oxide. As noted, a particularly preferred amine oxide is APA-T, sold by Baker Oil Tools as SURFRAQ™ VES. SURFRAQ™ is a VES liquid product that is 50% APA-T and greater than 40% propylene glycol. These viscoelastic surfactants are capable of gelling aqueous solutions to form a gelled base fluid. The additives of this invention are used to prepare a VES system sold by Baker Oil Tools as DiamondFRAQ™ DIAMONDFRAQ VES system. DIAMONDFRAQ™ VES system with its assured breaking technology overcomes reliance on external reservoir conditions in order to break, as compared with products such as CLEARFRAC™ TM VES system.

The methods and compositions herein also cover commonly known materials as AROMOX™ APA-T formulation manufactured by Akzo Nobel and other known viscoelastic surfactant gelling agents common to stimulation treatment of subterranean formations.

The amount of VES included in the fracturing fluid depends on at least two factors. One involves generating enough viscosity to control the rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 25% by volume, alternatively up to about 12 vol % of the total aqueous fluid (from about 5 to 120 gptg). In another non-limiting embodiment, the range for the present formulations is from about 1.0 to about 6.0% by volume VES product. In an alternate, non-restrictive form of the invention, the amount of VES ranges from a lower limit of about 2 independently to an upper limit of about 10 volume %.

It is expected that the breaking compositions of this invention can be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids (including foamed fracturing fluids), gravel pack fluids, viscosifiers used as diverters in acidizing (including foam diverters), VES viscosifiers used to clean up drilling mud filter cake, remedial clean-up of fluids after a VES treatment (post-VES treatment) in regular or foamed fluid forms (i.e. the fluids may be "energized") with or the gas phase of foam being $N_2$ or $CO_2$, and the like.

A value of the invention is that a fracturing or other fluid can be designed to have enhanced breaking characteristics. That is, fluid breaking is no longer dependant on external reservoir conditions for viscosity break and is controllable: the rate of viscosity reduction, if complete break is achieved/occurs throughout the reservoir interval, and the like. Importantly, better clean-up of the VES fluid from the fracture and wellbore can be achieved thereby. Better clean-up of the VES directly influences the success of the fracture treatment, which is an enhancement of the well's hydrocarbon productivity. VES fluid clean-up limitations and failures of the past can now be overcome or improved by the use of DIAMONDFRAQ™ improved VES gel clean-up technology.

In order to practice the method of the invention, an aqueous fracturing fluid, as a non-limiting example, is first prepared by blending a VES into an aqueous fluid. The aqueous fluid could be, for example, water, brine, aqueous-based foams or water-alcohol mixtures. Any suitable mixing apparatus may be used for this procedure. In the case of batch mixing, the VES and the aqueous fluid are blended for a period of time sufficient to form a gelled or viscosified solution. As noted, the breaking composition of this invention is added separately after the fluid is substantially gelled, in one non-limiting embodiment. In another non-limiting embodiment a portion or all of the breaking composition may be added prior to or simultaneously with the VES gelling agent if the breaking agent is in encapsulation form.

Propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design required. The base fluid can also contain other conventional additives common to the well service industry such as water wetting surfactants, non-emulsifiers and the like. As noted herein, the base fluid can also contain other non-conventional additives which can contribute to the breaking action of the VES fluid, and which are added for that purpose in one non-restrictive embodiment.

Any or all of the above mineral oils may be provided in an extended release form such as encapsulation by polymer or otherwise, pelletization with binder compounds, absorbed or some other method of layering on a microscopic particle or porous substrate, and/or a combination thereof. Specifically, the mineral oils may be micro- and/or macro-encapsulated to permit slow or timed release thereof. In non-limiting examples, the coating material may slowly dissolve or be removed by any conventional mechanism, or the coating could have very small holes or perforations therein for the mineral oils within to diffuse through slowly. For instance, a mixture of fish gelatin and gum acacia encapsulation coating available from ISP Hallcrest, specifically CAPTIVATES® liquid encapsulation technology, can be used to encapsulate mineral, plant, fish, synthetic and other saturated oils of this invention. Also, polymer encapsulation coatings such as used in fertilizer technology available from Scotts Company, specifically POLY-S® product coating technology, or polymer encapsulation coating technology from Fritz Industries could possibly be adapted to the methods of this invention. The mineral oils could also be absorbed onto zeolites, such as Zeolite A, Zeolite 13X, Zeolite DB-2 (available from PQ Corporation, Valley Forge, Pennsylvania) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICRO-SPONGE™ (available from Advanced Polymer Systems, Redwood, California) and cationic exchange materials such as bentonite clay or placed within microscopic particles such as carbon nanotubes or buckminster fullerenes. Further, the mineral oils may be both absorbed into and onto porous or other substrates and then encapsulated or coated, as described above.

In a typical fracturing operation, the fracturing fluid of the invention is pumped at a rate sufficient to initiate and propagate a fracture in the formation and to place propping agents into the fracture. A typical fracturing treatment would be conducted by mixing a 20.0 to 60.0 gallon/1000 gal water (60.0 liters/-1000 liters) amine oxide VES, such as Sur-FRAQ, in a 2% (w/v) (166 lb/1000 gal, 19.9 kg/m$^3$) KCl solution at a pH ranging from about 6.0 to about 9.0. The breaking component may be added during the VES addition or more typically after the VES addition using appropriate mixing and metering equipment, or if needed in a separate step after the fracturing operation is complete, or combinations of these procedures.

In one embodiment of the invention, the method of the invention is practiced in the absence of gel-forming polymers and/or gels or aqueous fluids having their viscosities enhanced by polymers. However, combination use with polymers and polymer breakers may also be of utility. For instance, polymers may also be added to the VES fluid of this invention for fluid loss control purposes. Types of polymers that may serve as fluid loss control agents are various starches, polyvinyl acetates, polylactic acid, guar and other polysaccharides, gelatins, and the like.

The present invention will be explained in further detail in the following non-limiting Examples that are only designed to additionally illustrate the invention but not narrow the scope thereof.

GENERAL PROCEDURE FOR EXAMPLES 1 AND 2

To a blender were added tap water, 3 wt % KCl, followed by 3 vol % viscoelastic surfactant (WG-3L- Aromox® APA-T formulation available from Akzo Noble). The blender was used to mix the components on a very slow speed, to prevent foaming, for about 30 minutes to viscosify the VES fluid. Mixed samples were then placed into plastic bottles. Various components singly or together, in various concentrations, were then added to each sample, and the sample was shaken vigorously for 60 seconds. The samples were placed in a water bath at the indicated temperature and visually observed every 30 minutes for viscosity reduction difference between the samples. Since a goal of the research was to find a relatively rapid gel breaking composition, samples were only observed for 5 hours or less.

Viscosity reduction can be visually detected. Shaking the samples and comparing the elasticity of gel and rate of air bubbles rising out of the fluid can be used to estimate the amount of viscosity reduction observed. Measurements using a Grace 5500 rheometer at the indicated temperatures at 100 sec$^{-1}$ were used to acquire quantitative viscosity reduction of each sample.

EXAMPLE 1

Shown in FIG. 1 are the results of using three mineral oils, ESCAID® 110, HYDROBRITE® 200 and HYDROBRITE® 1000 mineral oils at different concentrations within WG-3L viscoelastic surfactant gelled fluid at 100° F. (38° C.). Surprisingly and unexpectedly complete VES viscosity reduction was observed with addition of a small amount of these oils over a 5 hour period using 5.0 gptg ESCAID® 110 mineral oil. Viscosity reduction over a 5 hour period was achieved using 2.0 gptg ESCAID® 110 mineral oil. Little reduction was seen in this Example for the more viscous HYDROBRITE® 200 and 1000 oils. This appears to indicate that the viscosity of the mineral oil plays a major role in the rate of the viscosity break of a VES-gelled fluid.

The results show an easy, efficient, and highly cost effective method for breaking VES gel viscosity.

EXAMPLE 2

Results showing the effect of using the mineral oils of Example 1 within WG-3L gelled fluid at 250° F. (121° C.) a much higher temperature, are presented in FIG. 2. Here the base fluid contained 10.0 ppg CaCl$_2$ (1.2 kg/liter) brine rather than the KCl brine, and VES-STA 1 was used at 2 pptg (0.2 kg/m$^3$); VES-STA 1 is a VES gel stability additive available from Baker Oil Tools. The results shown in FIG. 2 shows how even the much thinner, lower viscosity ESCAID® 110 mineral oil did not break the gel of the VES fluid upon contact or immediately once heated to 250° F. (121° C.) but rather lowered initial viscosity, with controlled viscosity reduction over time. Additionally, the 50/50 blend of ESCAID® 110/HYDROBRITE® 200 mineral oils gave typical VES fluid viscosity upon heat-up with then a very controlled viscosity reduction over time and was comparable to the 5.0 gptg ESCAID® mineral oil test fluid after 4 to 5 hours

EXAMPLE 3

FIG. 3 shows the effects of shear on a VES fluid containing 0.5 vol % ESCAID® 110 mineral oil. A field scale paddle tank batch mixer with centrifugal pump was used for the tests. The fluid temperature during the test was 83° F. (28° C.). The centrifugal pump circulated the fluid from the bottom to the top of the batch mixer tank at 3.0 bpm. Samples of the fluid were taken at 0, 2, 6 and 12 cycle volumes of VES-gelled fluid through the centrifugal pump and put on Grace and Brookfield pressurized rheometers for viscosity break testing at 150° F. (66° C.). Data was collected once the fluids reached 150° F. (66° C.);
approximately 16 minute heat-up time. It may be seen from FIG. 3 that the viscosity of the fluid decreased only gradually with increasing number of shear cycles, and thus fluids containing mineral oils as internal breakers are sufficiently shear stable to accomplish the purpose of the fluid (e.g. fracturing a formation) before viscosity is reduced.

As can be seen, the method of gel breaking described herein is simple, effective, safe, and highly cost-effective. A method is provided for breaking the viscosity of aqueous treatment fluids gelled with viscoelastic surfactants (VESs). Compositions and methods are also furnished herein for breaking VES-surfactant fluids controllably, completely and relatively quickly.

Compositions and methods are also disclosed herein for breaking VES-surfactant fluids where contact with reservoir fluids' external breaking mechanism is not required, although in some embodiments heat from the reservoir may help the breaking process. Compositions and methods are additionally provided for breaking VES-surfactant fluids where the breaking additive is in a phase internal to the VES-surfactant fluid. Further, methods and VES fluid compositions are described herein for breaking the viscosity of aqueous fluids gelled with viscoelastic surfactants using readily available materials at relatively inexpensive concentrations.

In the foregoing specification, the invention has been described with reference to specific embodiments thereof, and has been demonstrated as effective in providing methods and compositions for a VES fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, mineral oils, and other components falling within the claimed parameters, but not specifically identified or tried in a particular composition or fluid, are anticipated to be within the scope of this invention.

What is claimed is:

1. A method for controllably breaking the viscosity of aqueous fluids gelled with a viscoelastic surfactant (VES) comprising
  adding to an aqueous fluid substantially gelled with at least one viscoelastic surf actant at least one breaker present in an oil-soluble internal phase of the aqueous fluid in an amount effective to reduce the viscosity of the gelled aqueous fluid at a time other than essentially instantaneously, where the breaker is selected from the group consisting of mineral oils, hydrogenated polyalphaolefin oils, saturated fatty acids and combinations thereof; and
  heating the fluid to a temperature effective to cause the breaker to reduce the viscosity of the gelled aqueous fluid.

2. The method of claim 1 further comprising pumping the fluid into a wellbore after adding the breaker and before heating the fluid to reduce fluid viscosity.

3. The method of claim 1 where the breaker is a mineral oil and is at least about 99 wt % paraffin.

4. The method of claim 1 where the breaker is a mineral oil and has a distillation temperature in the range from about 160 to about 550° C., and a kinematic viscosity at 40° C. of from about 1 to about 250 cSt.

5. The method of claim 1 where the effective temperature ranges from about 70 to about 300° F. (about 21 to about 149° C.).

6. The method of claim 1 where the breaker is a mineral oil and the effective amount of the mineral oil ranges from about 0.1 to about 15 gptg based on the total fluid.

7. The method of claim 1 where the only viscosity reducing agent added is the breaker.

8. The method of claim 1 where the viscosity is broken within about 1 to about 16 hours.

9. A method for controllably breaking the viscosity of aqueous fluids gelled with a viscoelastic surfactant (VES) comprising
  adding to an aqueous fluid substantially gelled with at least one viscoelastic surfactant from about 0.1 to about 15 gptg of a mineral oil based on the total fluid, where the breaker is a mineral oil that is at least about 99 wt % paraffin and is present in an oil-soluble internal phase of the aqueous fluid; and
  heating the fluid to a temperature ranging from about 70 to about 300° F. (about 21 to about 149° C.) to cause the breaker to reduce the viscosity of the gelled aqueous fluid at a time other than essentially instantaneously.

* * * * *